United States Patent [19]

Dewallens

[11] 4,118,287

[45] Oct. 3, 1978

[54] METHOD FOR MAKING A METAL MASTER FOR PRODUCING A GRAMOPHONE RECORD

[75] Inventor: Léon Dewallens, Louvain, Belgium

[73] Assignee: Fabrication Belge de Disques "Fabeldis", Molenbeek-Saint-Jean, Belgium

[21] Appl. No.: 792,989

[22] Filed: May 2, 1977

[30] Foreign Application Priority Data

Jul. 8, 1976 [BE] Belgium .................................. 168739

[51] Int. Cl.$^2$ ........................ B29C 24/00; B29C 25/00
[52] U.S. Cl. ............................................ 204/6; 156/629; 264/106; 264/129; 264/219
[58] Field of Search ............... 264/106, 107, 219, 220, 264/129; 425/810, 385; 204/5, 6; 427/306; 156/629, 633, 634, 659, 668; 425/385, 810; 96/36, 115 P, 115 R

[56] References Cited

U.S. PATENT DOCUMENTS

| | | | |
|---|---|---|---|
| 3,787,274 | 1/1974 | Genma | 264/107 |
| 3,787,275 | 1/1974 | Genma | 264/107 |
| 3,962,495 | 6/1976 | Feldstein | 425/810 |

FOREIGN PATENT DOCUMENTS 2,245,984  4/1974  Fed. Rep. of Germany .......... 425/810

*Primary Examiner*—W. E. Hoag
*Attorney, Agent, or Firm*—Browdy and Neimark

[57] ABSTRACT

There is described a method for making a metal master for producing a gramophone record provided with writing in the center thereof, particularly inside a pressure press, and according to which the engraving of the sound-grooves is obtained from a mold element which is prepared by galvanically plating metal on a non-conductive support which has been engraved previously, in which means are provided to prepare an etching on the center part of the non-conductive support, on which support is then performed the galvanic metal plating to form the one mold element for producing one record side.

6 Claims, No Drawings

METHOD FOR MAKING A METAL MASTER FOR PRODUCING A GRAMOPHONE RECORD

This invention relates to a method for making a metal master for producing a gramophone record provided with writing in the center thereof, particularly inside a pressure press, and according to which the engraving of the sound-grooves is obtained from a mold element which is prepared by galvanically plating metal on a non-conductive support which has been engraved previously.

Gramophone records are obtained by using a mold the one side of which is provided with the engraving to be reproduced. The records are actually manufactured according to two different processes:

1. by means of a pressure press which requires a large heat exchange, as the mold has to be cooled down after each operation during which the record is hot-pressed;

2. by means of an injection press which does not have the same requirements regarding the heat-exchange cycle. It is possible to make in a mold suitable for such an operation, a center part comprising a separate plate reproducing the wording which should be present in the record center and to colour or "ink" said surface to produce the required wording by contrast and in a sunken way.

This method of operation is out of the question when working with a pressure press as it would not be possible to insure the heat-exchange cycle for the center plate. The production of gramophone records is impossible under such conditions. Gramophone records produced with a pressure press having a heating and cooling cycle alternating with the high working rate have to be provided with usual labels. Said operation is of course costly and can substantially slow-down the throughput.

The invention has for object to provide a saving in time and labour by rationalyzing particularly the application of wording to the center part of a gramophone record produced in a pressure press, possibly also in an injection press.

For this purpose means are provided to prepare an etching on the center part of the non-conductive support, on which support is then performed the galvanic metal plating to form the one mold element for producing one record side.

In an advantageous embodiment, said etching is obtained by arranging in the center of said non-conductive support a layer of photosensitive solution which is exposed to light under a photographic film showing the desired wording or writing, and by dissolving locally the non-conductive support to obtain an etching of said wording or writing which will allow afterwards the galvanic metal plating for making one mold element.

In another embodiment of the invention, said etching in the center part of the non-conductive support is prepared by using an etched film, said film is fastened on said center part of the non-conductive support which will receive or has already received the sound-groove engraving and the galvanic metal plating is performed on the complete non-conductive support.

Other details and advantages of the invention will stand out from the description given below by way of non limitative example of a method allowing to provide a gramophone record with wording or similar.

To better appreciate the various changes in the method according to the invention, reference will be made to the manufacturing steps for the making of a mold die. Such a die is obtained by galvanically plating a metal on a silver layer with a thickness in the range of a few millicrons plated on an etching which has been prepared previously on a non-conductive support. The non-conductive support which has been treated to form thereon a metal plating is also called galvanic counterpart. The non-metallic support can also be made from cellulose acetate.

The invention is applied to a first embodiment by using for the etching in the center part of the counterpart, a layer of photosensitive solution poured on that material the counterpart is made of, for instance cellulose acetate. Said photosensitive solution is then exposed under a photographic film and developed which gives an etching of the wording to be reproduced.

As the wording is etched into the counterpart, the metal electroplating thereon will cause said wording to appear with a relief in the same direction as the record sound-grooves. The metal plate resulting from electroplating gives in the pressure presses as well as in the injection presses, an area which comprises in the usual way said sound-grooves and a center part with an etched wording. Said part is covered in a way known per se, with a colored film. This causes to appear as sunken and in contrast the wording or similar writing.

The photosensitive layer spread on the record center part can be a soluble polyamide. Said solution should also comprise a photo-initiator such as benzophenone or anthraquinone. Any other suitable photo-initiator can of course also be used. The layer will comprise as usual in the solution, a heat stabilizer which can be hydroquinone.

The developing of the photosensitive layer is easily made with any suitable solvent, which also eats away the non-metallic support in the unprotected locations, that is where the photoconducting layer has been developed and dissolved.

In another embodiment, it is also possible to arrange in the center of the etched disk used for the making of the galvanic counterpart, a small disk or film which can be etched-in by developing by the same methods or similar processes.

A last embodiment of the method according to the invention lies in providing the center of the non-conductive support with a metal sheet which has first been etched to a thin layer. The fastening of said metal sheet to the center of the non-conductive layer is made according to any suitable method as well known to the man of the art. The coating with the original silver-based layer is made very easily on the composite support comprised of a conductive part and a non-conductive part.

The galvanic plating made on the supports obtained according to any one of the above methods provide mold elements which have for each side both the groove etching and an etching of the wording which is to be reproduced in the record center. Said wording appears as sunken when the adjoining area has been inked by some usual method which allows a very high throughput.

The invention finds a particular application in the art of the so-called pressure presses as the requirements of the heating and cooling cycle for the molds do not allow arranging in the mold center a discrete part bearing the wording which is to induce an etching on the finished record.

The invention can essentially be applied to the manufacture of records made in so-called injection presses, but the very different requirements of such presses can also be fulfilled with other means. As already mentioned, it is possible without any drawback to fasten in the center of the molds used with such injection presses, elements such as a copper or zinc plate the heat-exchange properties of which are compatible with the properties of the mold remainder.

The invention thus brings a novel solution to the manufacturing of mold elements for pressure presses which allows a high-rate production of gramophone records which have to undergo but an inking operation in the center to have the desired wording or any other image or writing appear in the center of each record side. Said operation is of course performed at a very high speed without any comparison with label application.

It must be understood that the invention is in no way limited to the above embodiments and that many changes can be brought therein without departing from the scope of the invention as defined by the appended claims.

I claim:

1. A method of making a metal molding die for producing in a pressure press gramophone records of plastic material provided with visual information in the center thereof, comprising the steps of:
   providing a non-conductive support adapted to have grooves containing audio information in the annular portion thereof;
   etching labeling information in a separate film layer;
   fastening said film bearing said labeling information onto the central circular portion of said non-conductive support; and
   galvanically plating metal on said non-conductive support and said film and stripping said metal to produce an integral and unitary molding die having a negative configuration to said non-conductive support at both the central portion bearing labeling information and the annular portion bearing audio information.

2. A method in accordance with claim 1, comprising forming grooves containing audio information in the annular portion of said non-conductive support prior to fastening said film bearing said labeling information onto the central circular portion of said non-conductive support.

3. A method in accordance with claim 1, comprising forming grooves containing audio information in the annular portion of said non-conductive support after fastening said film bearing said labeling information onto the central circular portion of said non-conductive support.

4. A method for making a metal holding die for producing in a pressure press gramophone records of plastic material provided with visual information in the center thereof, comprising the steps of:
   providing a non-conductive support adapted to have grooves containing audio information in the annular portion thereof;
   etching labeling information in a separate metal sheet, then attaching said metal sheet bearing said information in the central circular portion of said non-conductive support; and
   galvanically plating metal on said non-conductive support and said metal sheet and stripping said metal to produce an integral and unitary molding die having a negative configuration to said non-conductive support at both the central portion bearing labeling information and the annular portion bearing audio information.

5. A method in accordance with claim 4, comprising forming grooves containing audio information in the annular portion of said non-conductive support before attaching said metal sheet bearing said labeling information in the central circular portion of said non-conductive support.

6. A method in accordance with claim 4, comprising forming grooves containing audio information in the annular portion of said non-conductive support after attaching said metal sheet bearing said labeling information in the central circular portion of said non-conductive support.

* * * * *